March 13, 1934.  G. E. BRENHOLTZ  1,951,234
ART OF MANUFACTURING SOLID BALLS
Filed March 1, 1933  2 Sheets-Sheet 1
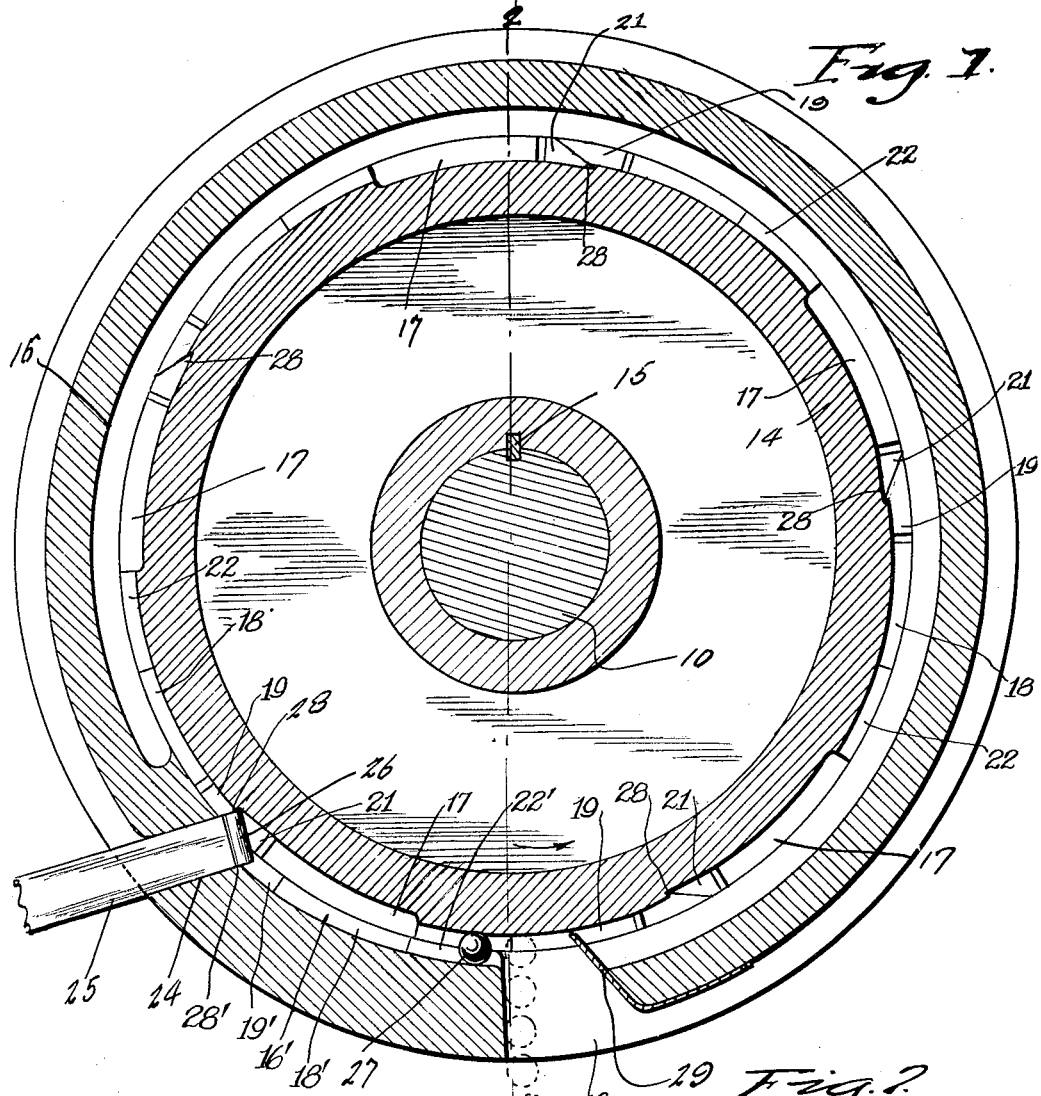
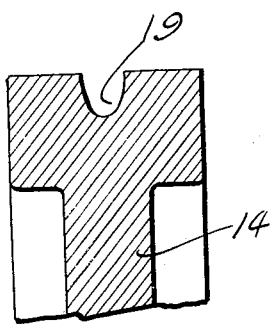
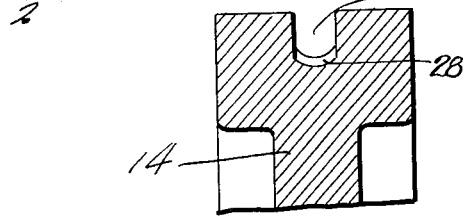
Inventor
G. E. Brenholtz
By Clarence A. O'Brien
Attorney March 13, 1934.    G. E. BRENHOLTZ    1,951,234
ART OF MANUFACTURING SOLID BALLS
Filed March 1, 1933    2 Sheets-Sheet 2

Inventor
G. E. Brenholtz
By Clarence A. O'Brien
Attorney

Patented Mar. 13, 1934

1,951,234

UNITED STATES PATENT OFFICE 1,951,234

ART OF MANUFACTURING SOLID BALLS

George Edwin Brenholtz, Hamilton, Ontario, Canada

Application March 1, 1933, Serial No. 659,164

2 Claims. (Cl. 80—18)

This invention relates to improvements in making solid balls and has for its object the provision of an improved combined rolling and forging operation, rolling and forging the short blank from which the balls are to be made into spherical or approximately spherical shape.

To this end the invention also has reference to an improved rolling and forging device of the type employing a disk in the periphery of which is a groove which faces a groove in a stationary ring; and the invention together with its numerous objects and advantages will be best understood from a study of the following description taken in connection with the accompanying drawings wherein:—

Figure 1 is a sectional elevational view taken through a ball rolling and forging device embodying the features of the present invention.

Figure 2:
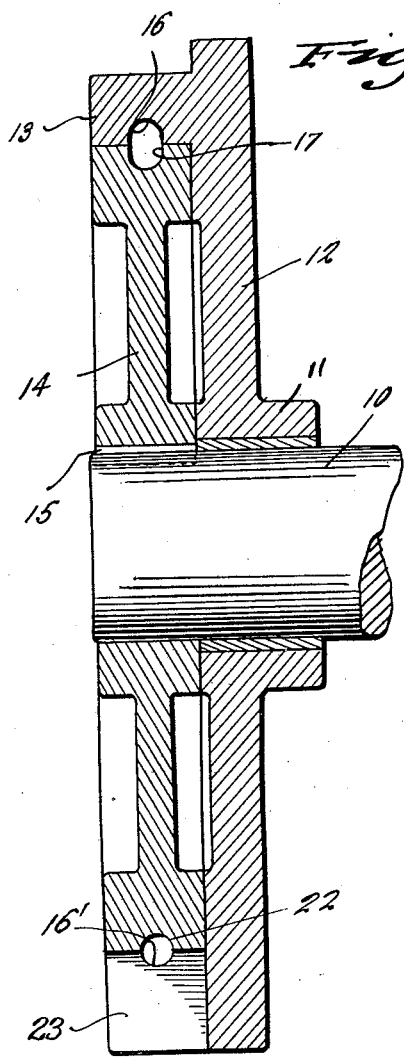
Figure 2 is a sectional view taken substantially on the line 2—2 of Figure 1.
Figure 3:
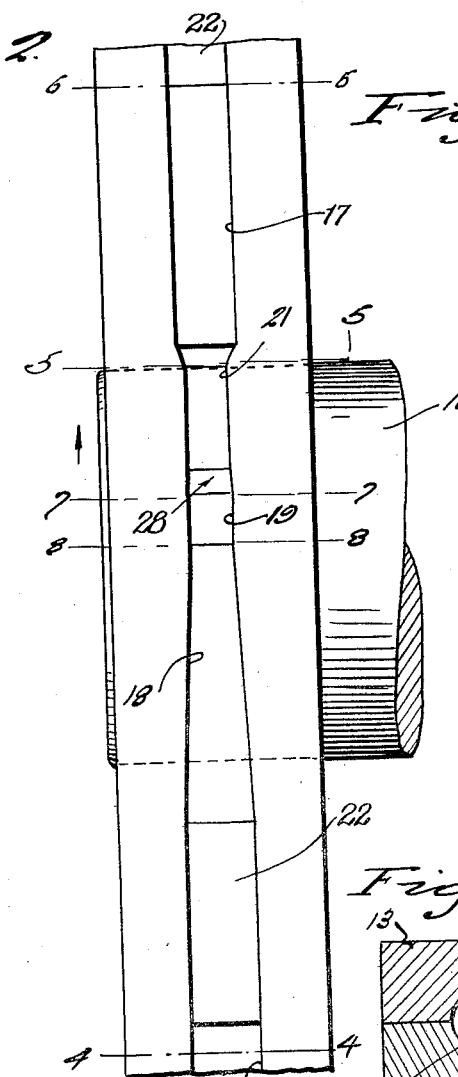
Figure 3 is a plan view of a portion of a rotatable disk.
Figure 6:
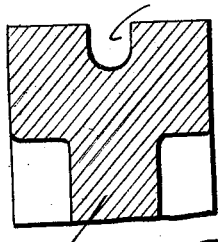

Figures 5, 6, 7 and 8 are sectional views taken substantially on the lines 5—5, 6—6, 7—7 and 8—8 respectively of Figure 3, Figure 6 also showing a part of the fixed disk and its ring in section.

Referring to the drawings by reference numerals, it will be seen that the forging and rolling device is conventional insofar as it embodies a suitably mounted and driven shaft 10, one end of which is journaled in a bearing 11 provided in a substantially circular, fixed disk 12. The disk 12 on one face thereof is provided with a stationary ring 13 and arranged within the confines of the ring 13 is a rotary disk 14.

The disk 14 is secured to the shaft 10, as at 15, to revolve with the shaft.

The ring 13 has a ball discharging opening 23 in its bottom part and a substantially semi-circular groove 16 is formed in the inner circumference of the ring and extends from this opening counter-clockwise to a point an appreciable distance from that wall of the opening which is opposite the wall from which the groove starts. This groove 16 is simply a clearance groove and does not act in any way to form the balls. The die groove 16' of the ring is formed in that part of the ring lying between the opening 23 and that end of the groove 16 which is to the left of the opening, as shown in Figure 1. A substantially tangential opening 24 is formed in the ring and has its inner end communicating with the front or left hand end of the die groove 16' for receiving the shear knife 25 which is operated in any suitable manner and acts to shear a slug from an end of a heated bar of metal, suitably supported in the path of the knife so that on the inward movement of the knife, the knife first shears a slug 26 from the bar and then forces the slug through the opening 24 into the front or left hand end of the die groove 16'. A shoulder 28' is formed in the die groove 16' where the inner end of the opening 24 communicates therewith, against which shoulder the lower end of the slug 26 rests, as shown in Figure 1. This die groove 16' is formed exactly like a die section of the die groove formed in the outer circumference of the disk 14.

Figures 4, 5:
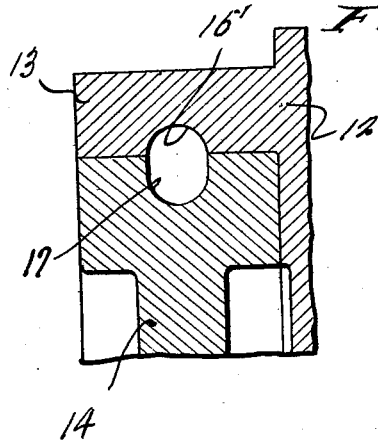
Figure 4 is a fragmentary sectional view taken substantially on the line 4—4 of Figure 3, this view also being taken through a part of the fixed disk and its ring.

The front end of each die section of this groove in the disk 14 is shown at 17, and this front part is of considerable length and is relatively deep and wide and of substantially U-shape in cross section, as shown in Figure 4. This front portion 17 permits the slug to enter the machine before being engaged by the shoulder 28 forming part of each die section of the disk 14. The rear portion of this part 17 gradually narrows and decreases in depth to the shoulder 28, as shown at 21 in Figures 3 and 5, so that the slug will be caused to properly engage the shoulder during rotary movement of the disk 14, which causes the part 17 to move from over the slug, so that the part 21 will receive the slug and then the upper end of the slug will be engaged by the shoulder 28, as shown in Figure 1. Each die section of the disk 14 has a portion 19 which gradually decreases in depth and increases in width from the shoulder, and this portion 19 merges into the portion 18 which more abruptly increases in width and decreases in depth until this portion 18 merges into the portion 22, which is of true semi-circular shape in cross section, as shown in Figure 6, and which cooperates with a similar portion 22' of the die groove 16' of the ring to finish the ball and make the same a sphere. As shown in Figure 1, from these parts 22 and 22', the balls drop through the opening 23.

As before stated, the die groove 16' of the ring is made similar to each die section of the disk 14 and the operation of the shear knife 25 is so timed that when the part 17 of a die section of the disk 14 reaches a position over the knife opening 24, the knife will move a slug into position and then during further movement of the disk, the upper end of the slug will be engaged by the shoulder 28 of said die section of the disk, the lower end of the slug engaging the shoulder 28' of the die groove 16' of the ring, and thus movement of the disk will upset the slug on its long axis and then the slug moves forwardly with the disk 14 and is engaged by the part 19 of the die section of the disk 14 and the similar part 19' of the die groove 16'. Then the slug is engaged by the part 18 of the disk 14 and the similar part 18' of the groove 16', and finally the slug is engaged by the parts 22 and 22', shown in Figure 6, which finishes the operation and produces a spherical member, shown at 27 in Figure 1. The spheres or balls produced by this machine are free from poles and equator, so that it is not necessary to grind the balls after they leave the machine.

That end of the groove 16 in the ring which opens into the opening 23 is covered by a strip 29 supported from the ring, as shown in Figure 1.

As will be seen, but a small part of the ring 13 has the groove 16' therein for co-acting with each die section of the disk 14 for forming the balls from the slugs and as before stated, this groove 16' is made substantially like each die section of the disk, but, of course, this die groove 16' is not provided with the wide and deep part 17.

It will be found, in actual practice, that a machine of this character in which the revolving disk is provided with a graduating shaping or truing groove having the features comprehended by this invention, will provide for the efficient manufacture of balls of a much greater diameter than that of the slug, and further, a rolling and forging machine embodying the features of the present invention will prove efficient in the production of a more perfect ball within a minimum amount of time than can now be obtained in the time required for the production of metal balls with the machines now generally employed.

Even though I have herein shown and described the preferred embodiment of the invention, it is to be understood that the same is susceptible of further changes, modifications and improvements coming within the scope of the appended claims.

Having thus described the invention, what I claim as new is:—

1. In a ball forming machine, a stationary ring having a discharge opening in its bottom part and a die groove in its inner circumference extending from the opening in a clockwise direction to a point a distance from said opening, said ring having a slug entrance opening therein substantially tangentially arranged, the junction of said entrance opening with the front end of the groove forming a shoulder which forms a seat for a portion of the lower end of the slug, said groove gradually decreasing in depth and increasing in width from the shoulder to the discharge opening, that portion of the groove adjacent the discharge opening being of semi-circular shape in cross section, a rotary disk located in the ring and having a continuous groove in its outer circumference, said groove forming a plurality of die sections, each section including a wide and deep elongated part for receiving a portion of the slug when the slug is first placed in the machine, the rear end of said elongated part terminating in a shoulder for engaging a part of the upper end of the slug and each die section of the disk gradually decreasing in depth and increasing in width from the shoulder rearwardly, the rear portion of each die section being of semi-circular shape and having its rear end in communication with the deep and wide part of the next section.

2. In a ball forming machine, a stationary member having a discharge opening therein and a slug entrance opening therein, said member also having a die groove therein extending from the entrance opening to the discharge opening, the junction of the entrance opening with the groove forming a shoulder against which a portion of the lower end of a slug rests, said groove gradually decreasing in depth and increasing in width from the entrance opening to the discharge opening, that portion of the groove adjacent the discharge opening being of semi-circular shape and terminating at the discharge opening, a movable member having a die groove therein in alignment with the die groove of the stationary member, said die groove of the movable member having a shoulder therein for engaging part of the upper end of a slug, the lower end of which rests upon the shoulder of the stationary member, said shoulders being inclined to hold the slug at an inclination in the two grooves when engaged by the two shoulders, the front portion of the groove in the movable member being wide and deep and that portion extending rearwardly of the shoulder gradually decreasing in depth and increasing in width to its rear portion, said rear portion being of semi-circular shape in cross section to cooperate with the semi-circular portion of the groove in the stationary member to finish the operation of converting the ball into a sphere.

GEORGE EDWIN BRENHOLTZ.